Dec. 11, 1956  R. E. HUNT ET AL  2,773,608
MATERIAL HANDLING APPARATUS OF THE CONVEYOR TYPE
Filed Nov. 25, 1955  3 Sheets-Sheet 1
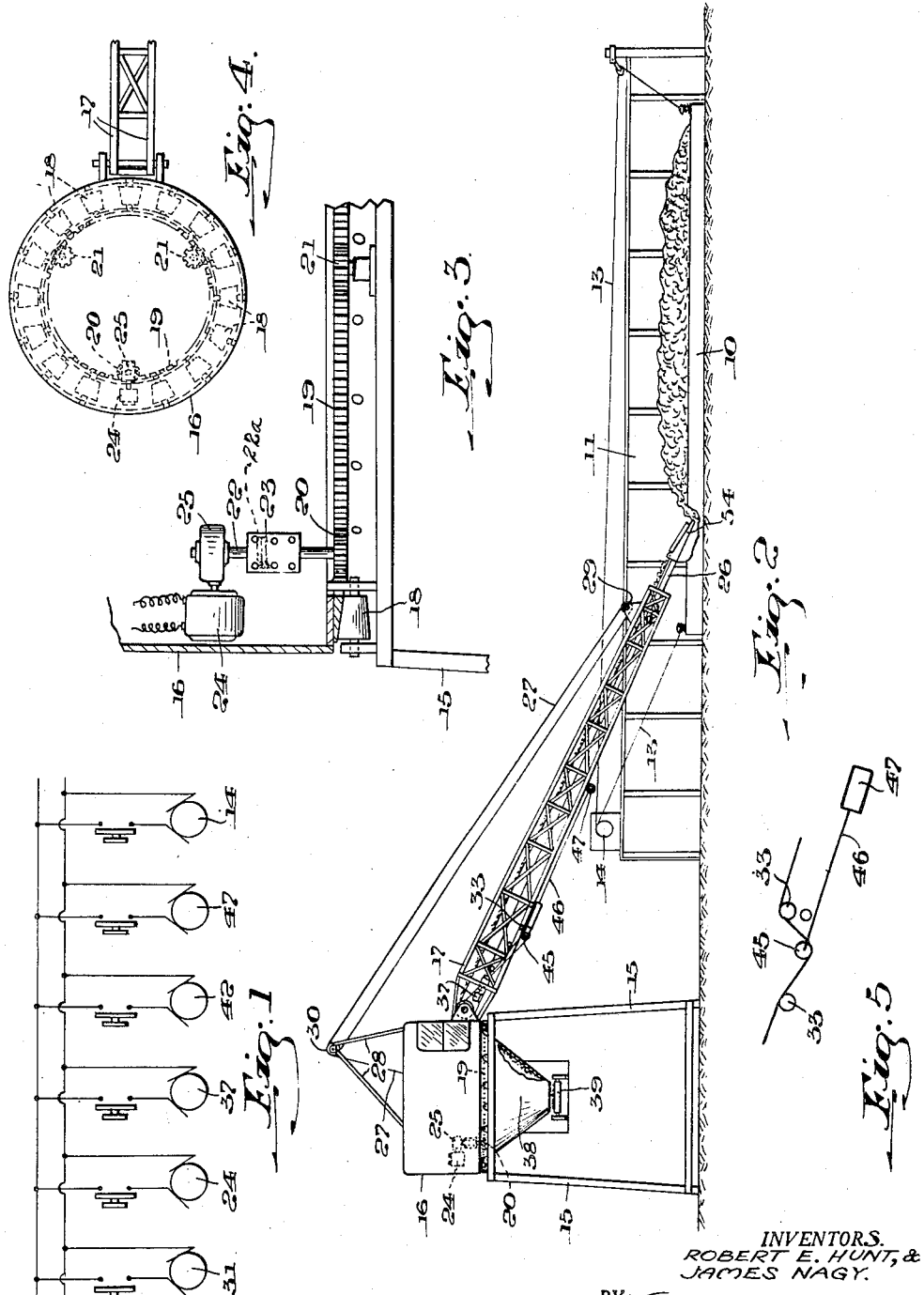
INVENTORS.
ROBERT E. HUNT, &
JAMES NAGY.
BY Ashworth Martin
their
ATTORNEY

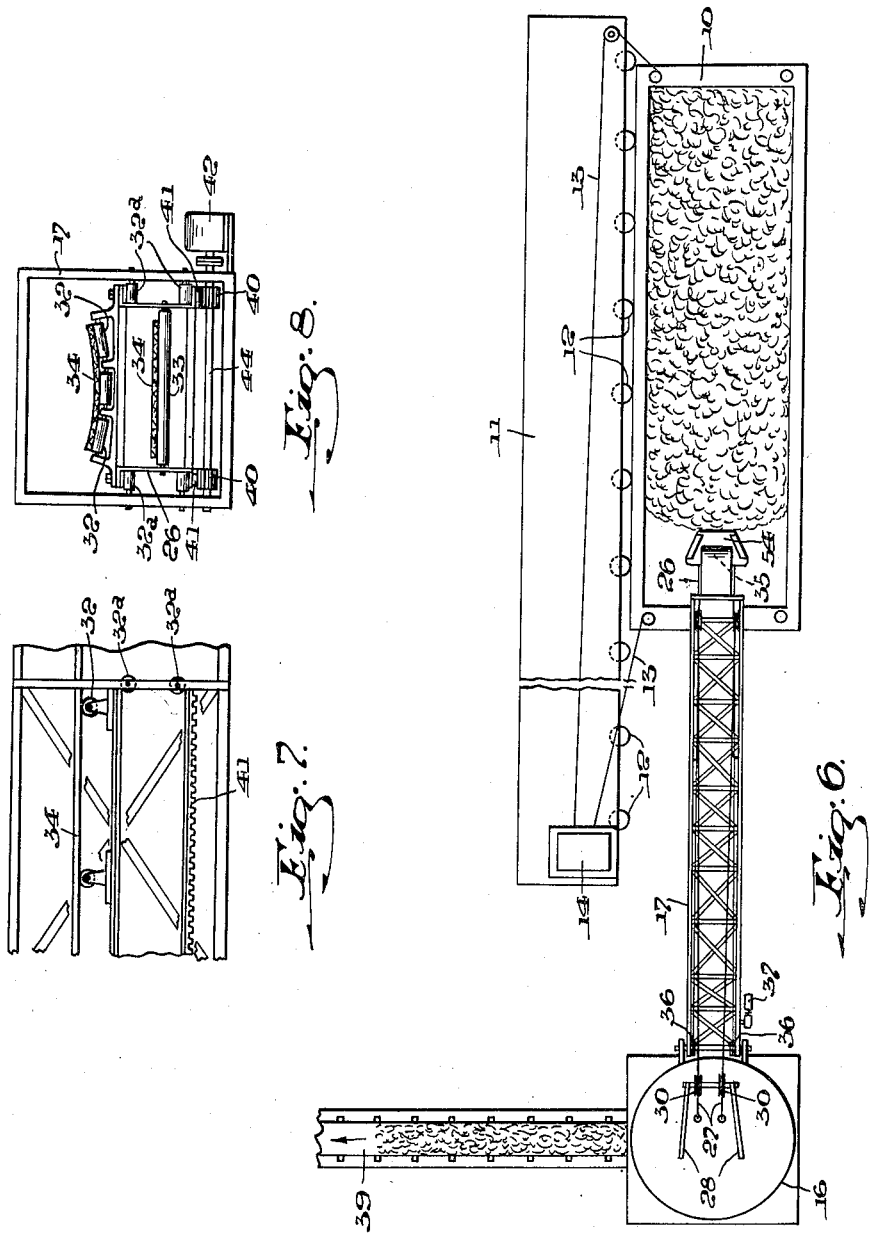

Dec. 11, 1956     R. E. HUNT ET AL     2,773,608
MATERIAL HANDLING APPARATUS OF THE CONVEYOR TYPE
Filed Nov. 25, 1955     3 Sheets-Sheet 3
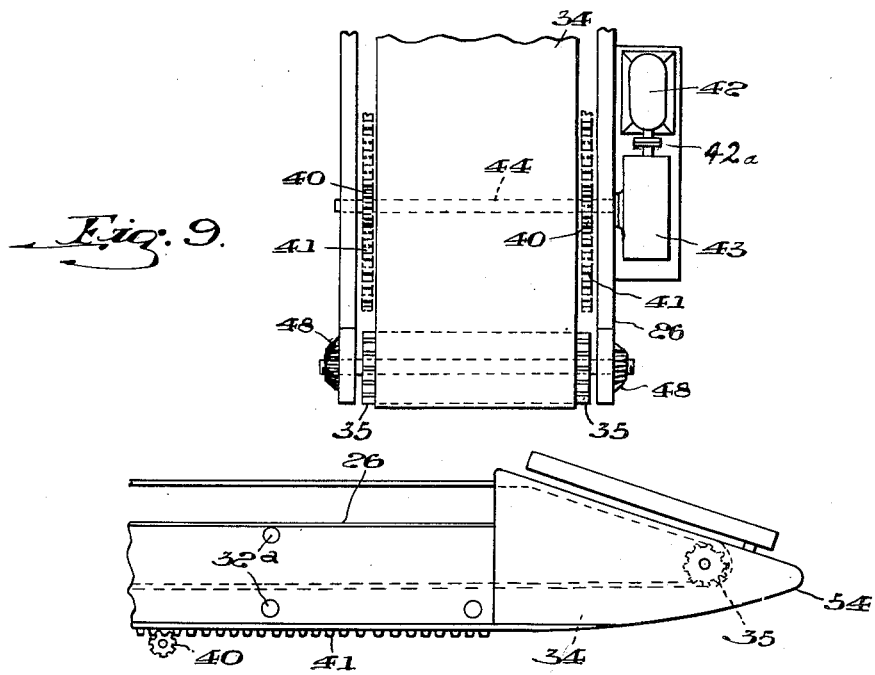
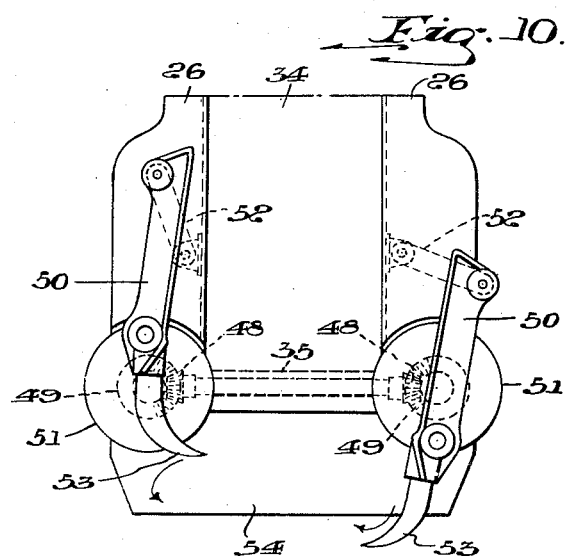
INVENTORS.
ROBERT E. HUNT, &
JAMES NAGY
BY Archworth Martin
their ATTORNEY

United States Patent Office 2,773,608
Patented Dec. 11, 1956

2,773,608

MATERIAL HANDLING APPARATUS OF THE CONVEYOR TYPE

Robert E. Hunt and James Nagy, Butler, Pa.

Application November 25, 1955, Serial No. 549,006

8 Claims. (Cl. 214—14)

Our invention relates to material-handling apparatus, and more particularly to those of the conveyor type for use in handling loose material such as ore, coal, sand, gravel. In the accompanying drawings, the apparatus is shown, by way of example only, as being used for the unloading of river barges from a stationary unloading station.

One of the objects of our invention is to provide unloading apparatus of the belt conveyor type, whereby barges or the like can be unloaded more expeditiously than by use of apparatus heretofore employed, and with a minimum of shifting of the barges at the unloading dock.

Another object of our invention is to provide motor-driven apparatus for positioning and moving the barges relative to the conveyor and moving the conveyor in vertical and various horizontal directions relative to the floor of the barge or a pile of the material, the various motors for manipulating the conveyor and the barge being conveniently controlled by an operator at a fixed station.

The apparatus comprises a main boom whose outer end can be swung in vertical and horizontal directions and which, at its outer end, has an extension frame that serves as a crowding boom and carries a scoop and gathering fingers that will move the material onto the scoop and a conveyor belt while the crowding boom is being continuously moved against a body of the material.

In the accompanying drawings,

Figure 1 is a diagrammatic view of the various electrical motors used in the system and the control switches therefor, which switches will all be operated in the cab;

Fig. 2 is a longitudinal edge view, partly in vertical section, showing the manner in which the conveyor is entered into a barge;

Fig. 3 is an enlarged view showing the manner in which the operator's cab is rotatably supported upon a framework;

Fig. 4 is a plan view of a portion of the apparatus of Fig. 3;

Fig. 5 is a schematic view showing the manner in which the conveyor belt of Fig. 2 is maintained in tension during use, and when the auxiliary conveyor frame is projected or retracted at the barge;

Fig. 6 is a plan view of the apparatus of Fig. 2;

Fig. 7 is an enlarged side elevational view of a portion of the apparatus of Fig. 2;

Fig. 8 is a cross sectional view therethrough;

Fig. 9 is a fragmentary plan view showing a portion of the auxiliary conveyor frame used with the main conveyor frame of Fig. 2, together with the mechanism for advancing and retracing it;

Fig. 10 is a side elevational view thereof, and

Fig. 11 is a plan view of the apparatus of Fig. 9, with the gathering arm or fingers operatively associated therewith.

The apparatus is here shown as used in the unloading of a barge 10 moored to a dock 11, it being held against bumpers or anti-friction rollers 12 by a cable 13 connected to the ends of the barge and extending around a reversible motor-driven winch at 14, so that when the winch is operated, it will serve to shift the barge longitudinally with respect to the dock and the unloading conveyor, in either direction, depending upon in which direction the motor-driven winch is driven.

A framework 15 serves as a support for an operator's cab 16 and the upper end of a boom that comprises a main conveyor frame 17. The operator's cab is supported on rollers 18 journaled on the frame 15, the frame also supporting an internally-toothed circular rack 19 with which pinions 20 and 21 mesh. The circular gear and the pinions could, of course, be located at the outer side of the cab. These pinions serve as guides for maintaining the cab 16 in place, the pinion 20 being mounted on a shaft 22 that extends through a bearing 23 secured to the cab wall. The shaft is driven by a motor 24 through reduction gearing 25 and a friction clutch at 22a.

The boom for the main conveyor frame 17 is pivotally connected to the cab, at its upper end, and telescopically supports an extensible conveyor frame 26. The lower end of the conveyor frame 17 is raised and lowered by two cables 27 that extend across framework 28 on the cab 16 and pass around pulleys 29 at the lower end of the conveyor and guide pulleys 30 on the framework, to a motor 31 in the cab, that is indicated schematically in Fig. 1 of the accompanying drawing.

The conveyor frame 17 has rollers 32 and 33 journaled therein for supporting the upper and lower runs of a conveyor belt 34 which passes around a guide roller 35 in the extensible frame 26 and around a driven roller 36 in the upper run of the conveyor frame, the belt being driven by a motor 37.

The material drawn from the barge by the conveyor is discharged into a hopper 38 from where it falls upon a conveyor 39 for delivery to railroad cars or elsewhere. As shown in Fig. 8, toothed pinions 40 are journaled in the main frame and mesh with rack bars 41 secured to the underside of the auxiliary conveyor frame 26.

The conveyor frame 26 is shifted forwardly and rearwardly between upper and lower guide rollers 32a by a torque motor 42 that, through reduction gearing 43 and a slip clutch at 42a, drives a shaft 44 that carries the pinion 40. The lower rollers 32a hold the racks 41 tightly to their pinions.

In order to maintain conveyor belt 34 under driving tension, it is directed below two of the rollers 33 and around a roller 45 as shown in Fig. 5. The pulley 45 is connected to a cable 46 that is maintained under tension by a torque motor 47 which is constantly energized to maintain this tension.

As shown more clearly in Fig. 10, the guide roller 35 in the lower end of the auxiliary frame is ribbed, so that it will be rotated by the belt 34. The shaft of the roller 35 carries beveled pinions 48 that mesh with circular gear wheels 49 that are journaled in the frame 26. Gathering arms 50 are eccentrically mounted on rotatable discs 51. At the upper end, these arms are pivotally connected to links 52 that are, in turn, pivotally connected to the sides of the frame 26. The arms 50 are provided with hook-like extensions 53 which, when the discs 51 are rotated, will move through looped paths as indicated by the arrows, to scoop or gather in the material and move it to the pan or scoop 54 and the conveyor belt 34. They will also serve to loosen material such as sand, iron ore, etc., when it becomes formed into caked masses.

In the normal operation of unloading barges, the auxiliarly boom or conveyor frame 26 will be continually urged forward by the motor 42, while the conveyor belt is being driven, so that it will be gradually advanced into the load on the barge for a distance that may be as much as 15 or 20 feet. Thereupon, the motor will be reversed to retract the auxiliary conveyor frame and the main boom swung slightly to carry the conveyor frame 17 to another location at the front of the pile of material. The cycle of operations will then be repeated until material to such depth has been removed across the entire width of the barge. The barge may then be dropped 15 or 20 feet for the removal of another "swath" of material.

By this apparatus and method of operation, a barge can be unloaded much faster than by clam-shell buckets or conveyor belt apparatus of the types heretofore employed.

We claim as our invention:

1. Apparatus for unloading barges, comprising a cable for holding a floating barge in sidewise relation to a dock, a motor-driven winch for shifting the barge longitudinally, an operator's cab, a boom-like main conveyor frame pivoted at its inner end to the cab, for swinging movement of its outer end in a vertical plane, means for swinging the cab and the conveyor frame on a vertical axis, an auxiliary conveyor frame slidably projecting from the lower end of the main frame, pulleys on the inner end of the main frame and on the outer end of the auxiliary frame, respectively, and a looped conveyor belt passing around said pulleys and arranged to receive material at the lower outer end of the auxiliary frame and discharge it at the upper end of the main frame.

2. A structure as recited in claim 1, wherein that run of the belt which is below the main conveyor frame is passed around a tensioning pulley that is automatically shiftable in a direction to keep the belt taut.

3. A structure as recited in claim 2, wherein the main frame and the auxiliary frame have a rack and pinion connection that is driven by a motor which is controlled from the cab, for projecting and retracting the auxiliary conveyor.

4. Apparatus for unloading barges, comprising a cable for holding a floating barge in sidewise relation to a dock, a motor-driven winch for shifting the barge longitudinally, an operator's cab, a boom-like main conveyor frame pivoted at its inner end to the cab, for swinging movement of its outer end in a vertical plane, an electric motor for raising and lowering the outer end of the boom-like frame, an electric motor for rotating the cab and the conveyor frame on a vertical axis, an auxiliary conveyor frame slidably projecting from the main frame, an electric motor operable to project and retract the auxiliary frame, pulleys on the inner end of the main frame and on the outer end of the auxiliary frame, respectively, a looped conveyor belt passing around said pulleys, an electric motor for driving said belt, a tensioning pulley engaged by the lower run of the conveyor belt, and an electrical torque motor for holding the pulley and the belt under tension, all of the motor circuits being controllable at the cab.

5. Apparatus for unloading barges, comprising a cable for holding a floating barge in sidewise relation to a dock, a motor-driven winch for shifting the barge longitudinally, an operator's cab, a framework that supports the cab in elevated position relative to the dock, a boom-like main conveyor frame pivoted at one end to the cab, for swinging movement of its outer end in a vertical plane, means for swinging movement of its outer end in a vertical plane, means for swinging the cab and the conveyor frame on a vertical axis, an auxiliary conveyor frame slidably projecting from the lower end of the main frame, pulleys on the upper inner end of the main frame and on the outer end of the auxiliary frame, respectively, a looped conveyor belt passing around said pulleys and arranged to receive material at the lower outer end of the auxiliary frame and discharge it at the upper end of the main frame, and a hopper beneath the cab, in position to receive material that is discharged from the upper end of the conveyor belt.

6. A structure as recited in claim 5, wherein the hopper is carried by the said framework, and a take-off conveyor is supported at one end by the framework, in position to receive material from the hopper.

7. Apparatus as recited in claim 2, wherein a reversible power device constantly exerts a projecting force on the auxiliary frame, to gradually move the outer end of the belt against the material to be conveyed.

8. Apparatus for unloading barges, comprising a cable for holding a floating barge in sidewise relation to a dock, a motor-driven winch for shifting the barge longitudinally, an operator's cab, a boom-like main conveyor frame pivoted at its inner end to the cab, for swinging movement of its outer end in a vertical plane, means for swinging the cab and the conveyor frame on a vertical axis, an auxiliary conveyor frame slidably supported on the main frame and projectible from the outer end thereof, pulleys on the inner end of the auxiliary frame, a looped conveyor belt passing around the pulleys, means for constantly moving the auxiliary frame to projected position relative to the outer end of the main frame, means for constantly maintaining the belt under tension during movements of the auxiliary frame, and gathering means carried by the outer end of the auxiliary conveyor frame, for moving material onto the belt.

References Cited in the file of this patent

UNITED STATES PATENTS

| | | |
|---|---|---|
| 1,478,812 | Barene | Dec. 25, 1923 |
| 2,173,177 | Menk | Sept. 19, 1939 |